UNITED STATES PATENT OFFICE.

ALEXANDER M. LONG, OF PHILADELPHIA, PENNSYLVANIA.

COMPOSITION FOR THE TREATMENT OF THE SURFACES OF BRICKS.

SPECIFICATION forming part of Letters Patent No. 344,390, dated June 29, 1886.

Application filed February 24, 1886. Serial No. 193,035. (No specimens.)

*To all whom it may concern:*

Be it known that I, ALEXANDER M. LONG, a citizen of the United States, residing in the city and county of Philadelphia, in the State of Pennsylvania, have invented an Improved Composition for the Treatment of the Surfaces of Bricks, of which the following is a specification.

It is well known that the red-clay bricks of commerce which are employed in the construction of the walls of buildings are liable under the influence of varying atmospheric conditions to become discolored and to present a whitish appearance.

The object of my invention is to provide a composition of matter which can be applied to the exposed surfaces of bricks, as well as of other natural or artificial stones employed for building purposes, and which when applied will render the brick or stone proof against the changes in appearance arising from differences in temperature, rain, frost, and snow.

The ingredients of my composition are beeswax, linseed-oil, turpentine, and ammonia, which are preferably combined in the proportions of one-half pound of beeswax, one pint of linseed-oil, one pint of turpentine, and one-half pint of ammonia.

In forming the compound I first dissolve the beeswax in the linseed-oil by boiling it in the oil for about fifteen minutes. I then let the boiled mixture cool. I then add the turpentine, and afterward add the ammonia, finally stirring the mixture for about fifteen minutes.

The stirred mixture is the compound or composition invented, and, being liquid, is readily applied by brush or otherwise to the surface to be coated. The mixture as above made is when applied to brick practically colorless, not occasioning any change in the natural appearance of the brick.

When desired, I can introduce coloring matters to the mixture, so as to impart to the coated brick a color different from its natural color.

The proportions stated may be slightly varied without departure from the invention.

Having thus described my invention, I claim—

1. A composition of matter for the coating of brick or stone, consisting of beeswax, linseed-oil, turpentine, and ammonia.

2. The mode of compounding a composition of matter for coating brick or stone, which consists, first, in boiling beeswax in linseed-oil and allowing the boiled mixture to cool; second, in adding turpentine to the mixture; third, in adding ammonia to the mixture, and, fourth, in stirring the ingredients so combined, substantially as set forth.

In testimony whereof I have hereunto signed my name this 22d day of February, A. D. 1886.

ALEX. M. LONG.

In presence of—
JOHN FITZPATRICK,
MARY E. LONG.